Figure 1:
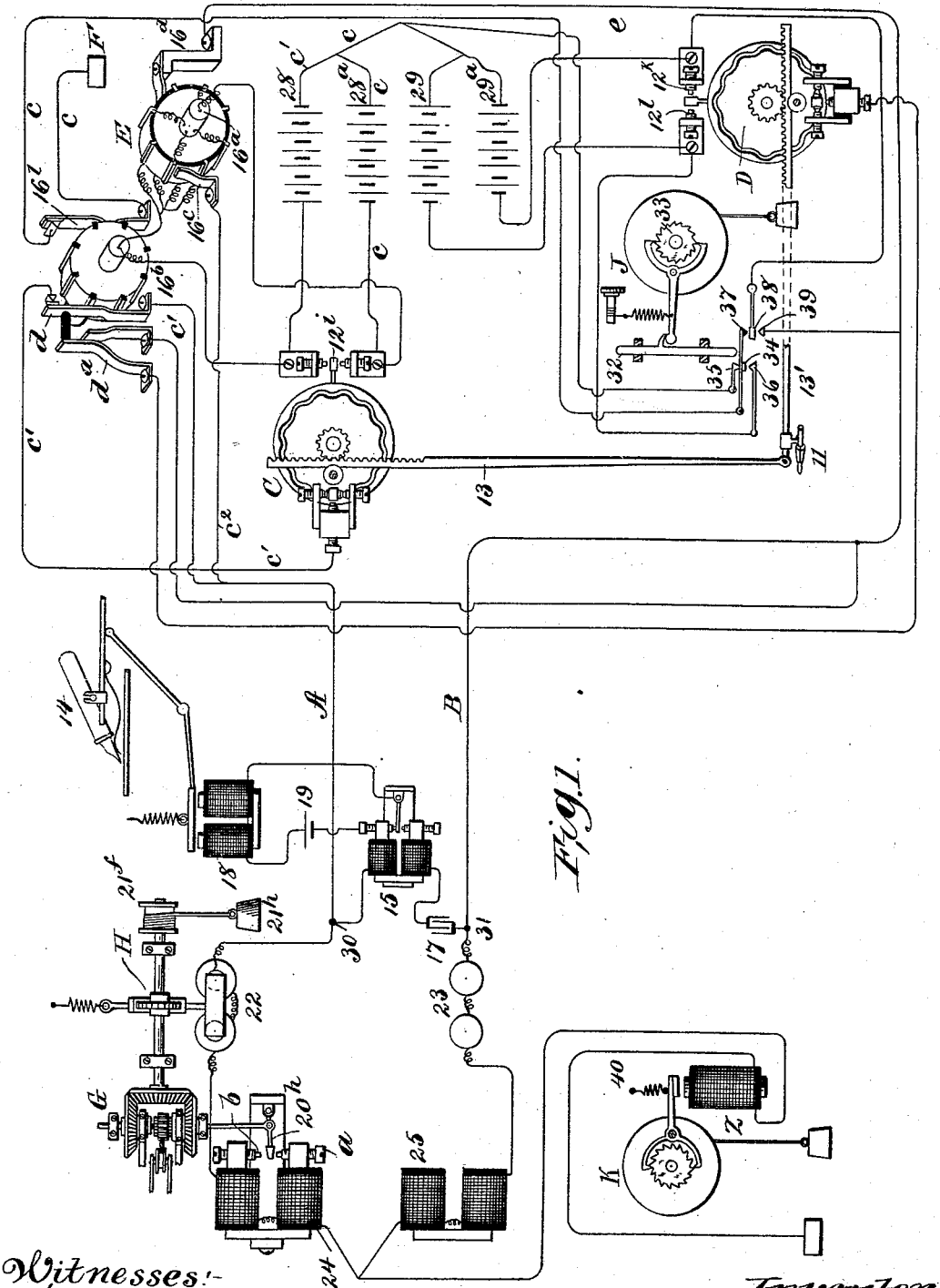

(No Model.) 4 Sheets—Sheet 1.

J. H. ROBERTSON.
WRITING TELEGRAPH.

No. 543,427. Patented July 23, 1895.

Witnesses:
W. E. Bowen
W. C. Pinckney

Inventor:
James Hart Robertson (No Model.) 4 Sheets—Sheet 2.
J. H. ROBERTSON.
WRITING TELEGRAPH.
No. 543,427. Patented July 23, 1895.
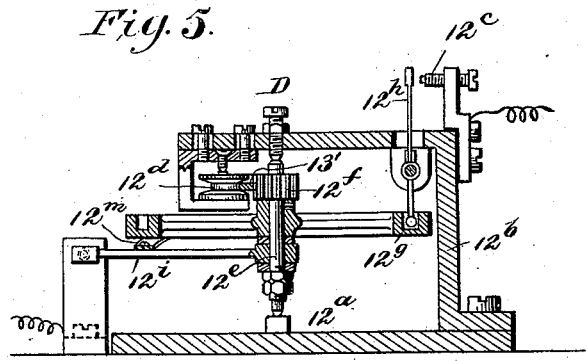
Fig. 5.
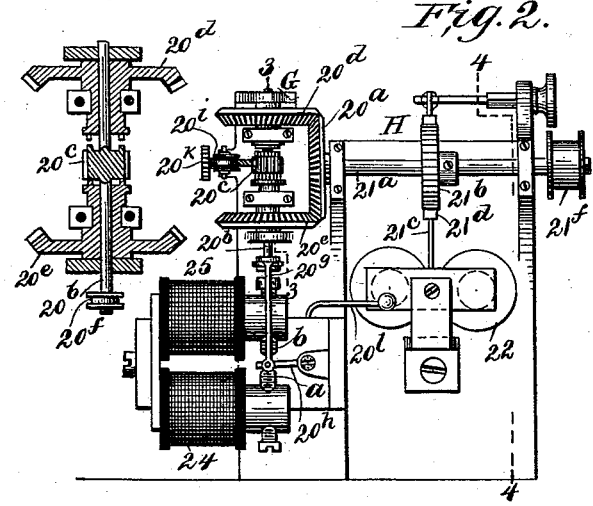
Fig. 3. Fig. 2.
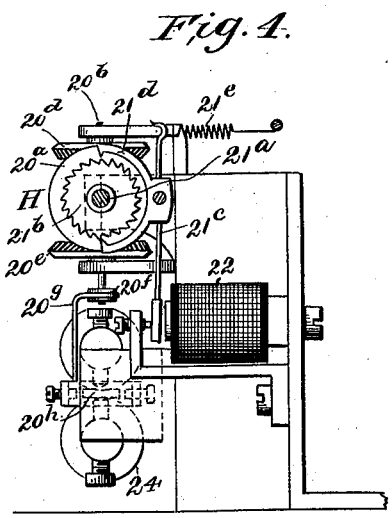
Fig. 4.
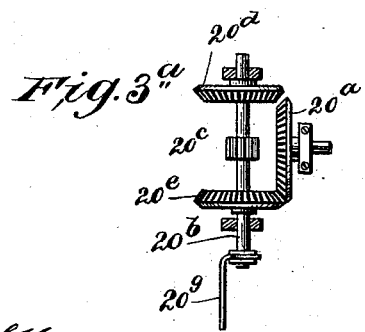
Fig. 3ª.
Witnesses:
N. C. Bowen
W. C. Pinckney
Inventor:
James Hart Robertson (No Model.) 4 Sheets—Sheet 3.

J. H. ROBERTSON.
WRITING TELEGRAPH.

No. 543,427. Patented July 23, 1895.

Witnesses:—
N. E. Bowen
W. C. Pinckney

Inventor.
James Hart Robertson

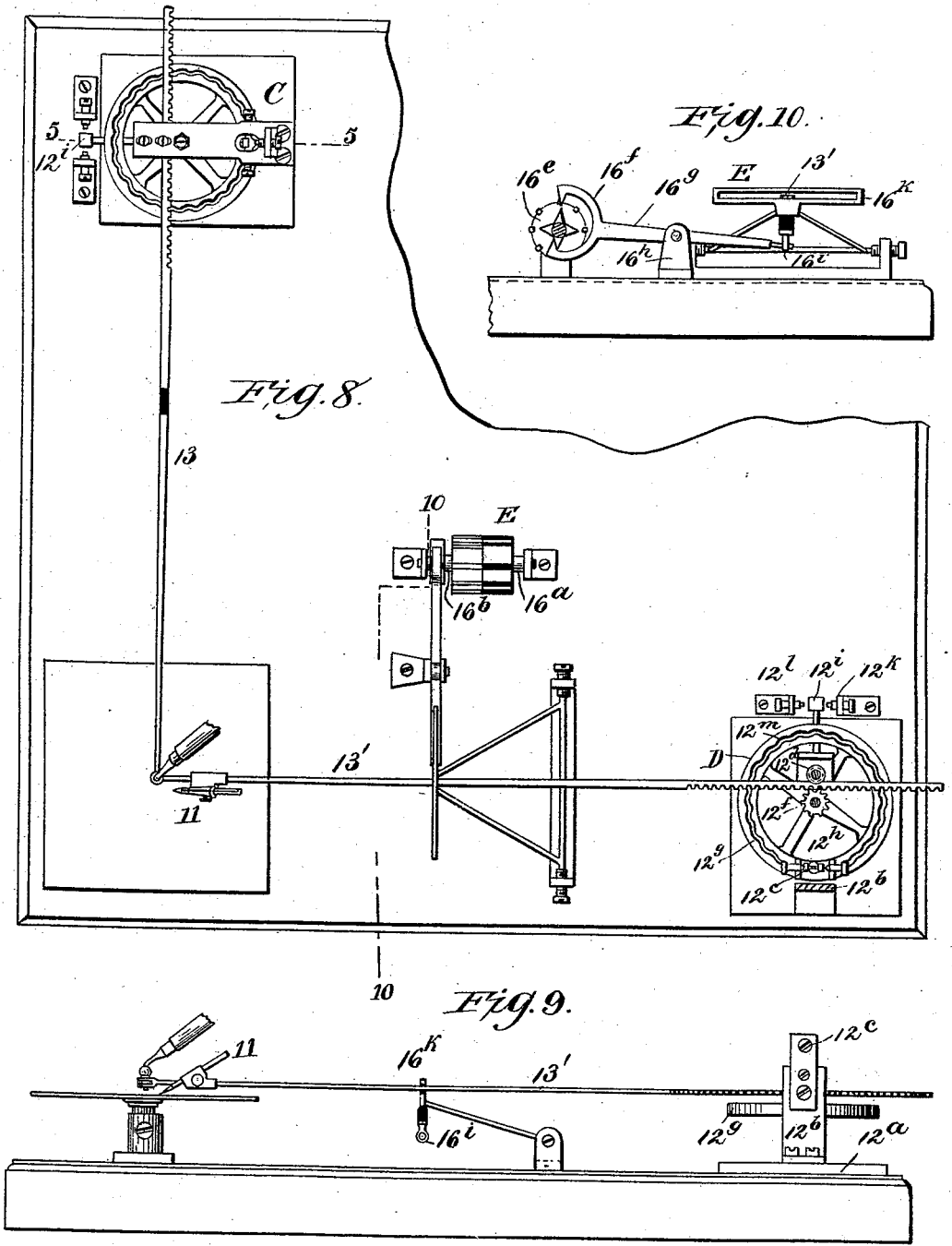

UNITED STATES PATENT OFFICE.

JAMES HART ROBERTSON, OF BROOKLYN, NEW YORK, ASSIGNOR TO WILLIAM E. GUMP, OF SAME PLACE.

WRITING-TELEGRAPH.

SPECIFICATION forming part of Letters Patent No. 543,427, dated July 23, 1895.

Application filed March 21, 1895. Serial No. 542,621. (No model.)

*To all whom it may concern:*

Be it known that I, JAMES HART ROBERTSON, a citizen of the United States, and a resident of Brooklyn, in the county of Kings and State of New York, have invented certain new and useful Improvements in Methods of and Apparatus for the Transmission of Autographic Signs, of which the following is a specification.

My invention relates to writing-telegraphs involving the principle now well known of compounding a point in two directions at an angle to each other, and my improvements are adapted to that system of writing-telegraphs in which intermittent impulses are sent from the transmitting-station to reproduce the movements at the receiver. In such a system the pulsations may be of successively like polarity or of successively opposite polarity. In the present instance the apparatus is adapted to currents of successively like polarity. It is now well understood that in instruments intended for this purpose the movements of the transmitting-pen produce a succession of pulsations in two electric circuits, the number of pulsations in the respective circuits being determined by the distance which the pen is moved in the respective directions. Such pulsations operate the magnets which control the mechanism which moves the arms of the receiving-pen, and the two motions made at the transmitter are compounded at the receiving-pen.

In my application for a patent for a pen-lifting mechanism for a writing-telegraph, filed December 19, 1894, Serial No. 532,376, the operating-current is an induced one generated by means of an induction-coil and a local battery at the transmitting-station, the said induced current being utilized over the same wires for conveying the currents that operate the lateral movements of the receiving-pen. In the present instance I dispense with the induction-coil and local battery at the transmitting-station and employ other modes of transmitting the impulses to lift the pen and shift the paper, utilizing two wires only, as in the application Serial No. 532,376, for all purposes. I employ in this instance, as in the aforesaid application, Serial No. 532,376, a condenser and polarized relay bridged across the incoming line-wires at the receiving end for the purpose of controlling the pen-lifting mechanism, but at the transmitting end I make use of an automatic commutating device adapted, as the transmitting-pen is lifted, to cut off the ground of the batteries at the transmitting-station simultaneously with the breaking of the two line-wires, changing the batteries to a single one of high electromotive force and forming with the line-wires a metallic circuit, thus transmitting a momentary impulse from this high electromotive-force battery through such metallic circuit and influencing the polarized relay in the circuit with the condenser at the receiving end, thus causing it to close the local circuit, which raises the pen at the receiver, and the said commutating device then instantaneously restoring the mechanism to its normal condition for transmitting the impulses which operate the receiving-pen laterally. On lowering the transmitting-pen similar changes are automatically produced, but the polarity of the momentary impulses of high electromotive force is reversed, which causes the polarized relay to break the local circuit whereby the receiving-pen was raised, the battery connections through the commutator to line being reversed with each successive operation of the commutator. As the receiving-pen drops to the paper the conditions for its reproducing lateral movements of the transmitting-pen are changed to their normal state.

I will now proceed to describe my invention in detail, having reference to the accompanying drawings, which form part of this specification, and wherein like features are indicated by like numerals and letters in the several views.

In the drawings, Figure 1 is a diagrammatic view of an embodiment of my invention, showing the transmitting and receiving mechanisms adapted for a system employing continuous intermittent impulses of one polarity, which give a forward movement to the receiving-pen, and impulses of an opposite polarity which give the reverse movements. Fig. 2 is a view in elevation of the receiving-pen-operating mechanism. Fig. 3 is a section, on an enlarged scale, on the line 3 3 of Fig. 2.

Figure 6:
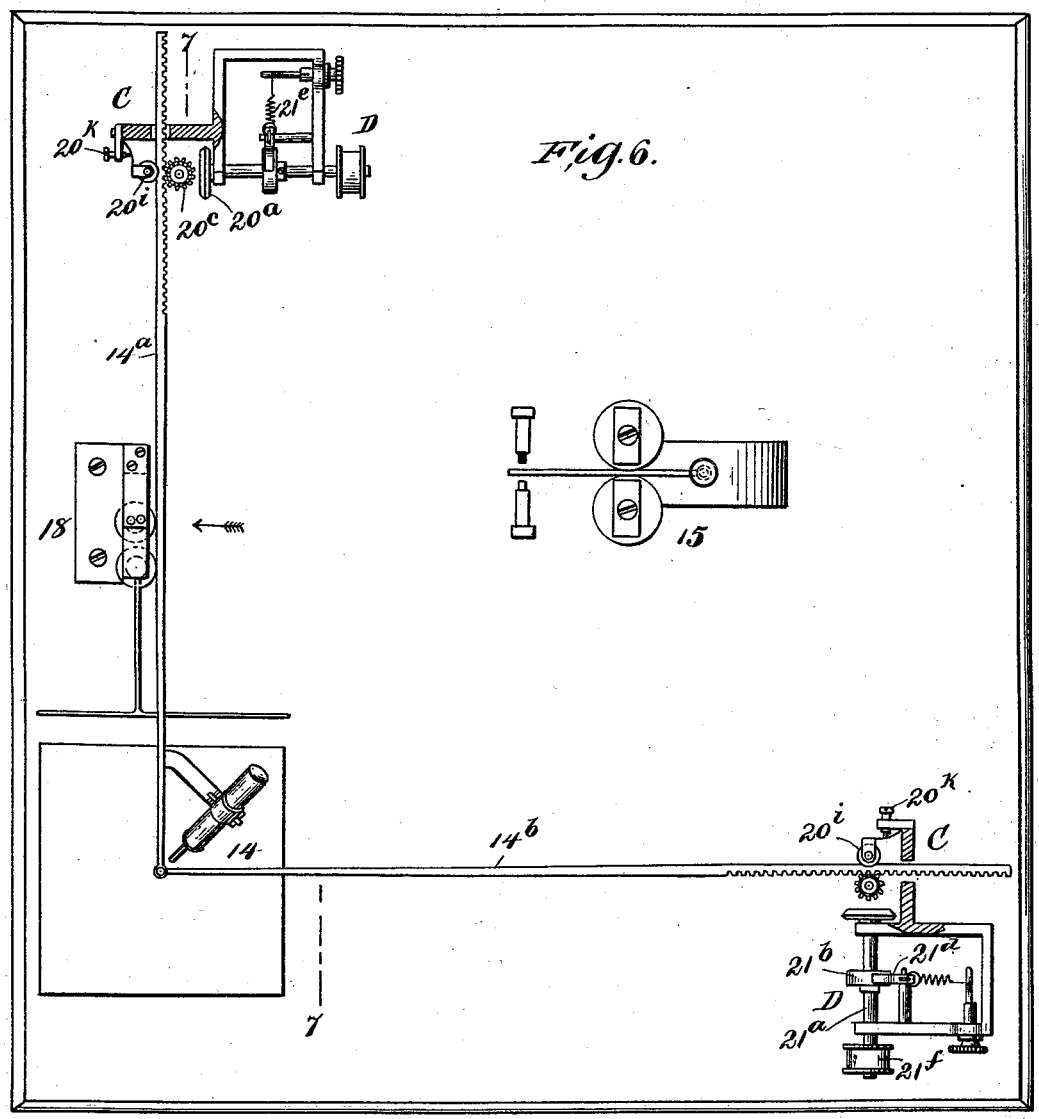
Figure 7:
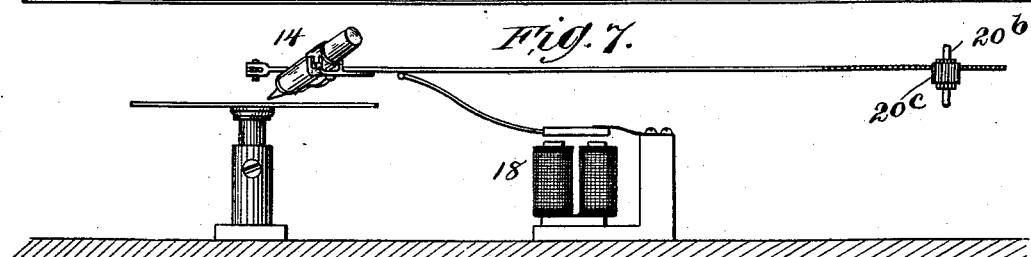

Fig. 3ª is a modification of the construction shown in Fig. 3 and herein described. Fig. 4 is an end elevation of the pen-operating mechanism, looking at the right of Fig. 2, a part of the supporting-frame being in section. Fig. 5 is a vertical section of the circuit-interrupter on the line 5 5 of Fig. 8. Fig. 6 is a plan view of the mechanism for operating the pen at the receiver. Fig. 7 is a vertical section on line 7 7 of Fig. 6, looking in the direction of the arrow. Fig. 8 is a plan view showing the mechanism whereby the lifting and lowering movements of the transmitter-pen are made. Fig. 9 is a view in elevation, looking at the front of Fig. 8, but not showing the commutator; and Fig. 10 is a cross-section on the line 10 10 of Fig. 8, showing the mechanical connection between transmitter-arm 13' and the commutator.

Referring to the drawings, 11 is the transmitting-pen connected mechanically with the circuit-interrupters C D by means of arms 13 13'.

The construction of the circuit-interrupters C D is shown more particularly in Fig. 5, wherein $12^a$ is the stand supporting the mechanism and $12^b$ a bracket, to which the contact-screw $12^c$ is attached, and which also supports from an overhanging member thereof the guide-roll or pressure-pulley $12^d$, which co-operates with the arms by which the transmitting-pen is moved. Rigidly mounted on the vertical shaft $12^e$ is a gear-wheel $12^f$, the teeth of which coact with the teeth on the outer end of the arms 13 13', thus making a mechanical connection between the transmitting-arms and the circuit-interrupters C D. By this means the pulsations are sent to the line as the transmitting-arms are moved in the two directions, the pressure-pulley $12^d$ keeping the arm in proper contact with said gear-wheel $12^f$. Affixed to shaft $12^e$ below the gear-wheel $12^f$ is a wheel $12^g$, provided on its upper surface with a sinuous channel, as shown in Figs. 1 and 8. This channel may be cut in the solid metal of the wheel, as indicated in Fig. 5, or it may be cut in a plate of metal to be suitably fastened to the wheel, the upper surface of which in the latter case is hollowed out, so as to permit the lower end of the pivoted vibratory contact-maker $12^h$ to co-operate with the sinuous channel to make contact with the line through screw $12^c$ as the wheel $12^g$ is turned.

Mounted on shaft $12^e$ below wheel $12^g$ is the pole-changing arm $12^i$, which is frictionally connected to the movable part of the interrupter, and which is adapted to make contact with the points $12^k$ $12^l$, according as to whether the transmitter-arms 13 13' are moved forward or backward. Affixed to the pole-changing arm $12^i$ is the curved spring $12^m$, which bears on the under side of the wheel $12^g$, this being one mode of providing the necessary frictional connection mentioned. The said pole-changing arm $12^i$ may, however, be so mounted upon the shaft $12^e$ as to provide for the required frictional connection without the use of the spring $12^m$.

The commutating device, which is a part of the transmitting mechanism, is shown at E. In Fig. 1, for the sake of clearness in indicating the connections, the commutator is shown in two sections and out of normal position. It is shown in normal position and form in Fig. 8. In practice the shaft of the commutator is made in two parts, which are insulated from each other. The cylinder of the commutator consists preferably of hard rubber, and on one section of its periphery it is provided with a series of conducting-strips, each alternate strip of the series being connected with the end $16^a$ of the shaft of the commutator and the other strips of the series being connected to the end $16^b$ of said shaft.

The two sets of strips constitute what may be called a "pair of contacts," and the two springs constitute another pair of contacts. The current is always in series from a strip of one set to one of the springs, and from a strip of the other set to the other of the springs; but the connection between these pairs of contacts is reversed with each operation of the commutator—that is, the spring which was connected with a strip of one set on one operation of the commutator will on the next operation be connected with a strip of the other set.

The pen of the receiver is indicated by 14, and in Fig. 1 it is shown out of position, so as to permit the electrical and mechanical connections to be more clearly illustrated. The normal position of the receiving-pen and its operating mechanism will be seen in Fig. 6. In this view the arms are indicated by $14^a$ $14^b$.

The other parts of the receiving mechanism will now be mentioned. At 15 is shown a polarized relay, at 17 a condenser, at 18 the pen-lifting and lowering electromagnet, and at 19 the battery of the local receiving-circuit. These parts constitute the pen lifting and lowering system at the receiver. The mechanism which gives the lateral motions of writing comprises a feed mechanism, as G, for each main line, an escapement, as H, for each main line, electromagnets, as 22 and 23, for controlling the escapements, and polarized magnets, as 24 and 25, for reversing the direction of movement of the arms of the receiver. In Figs. 2, 3, and 4 the construction of the escapement and the feed mechanism is illustrated. The mechanism which feeds the paper as required, as hereinafter explained, is indicated at J and K.

The feed mechanism and its escapement (shown in Figs. 2, 3, and 4) are described as follows: On the horizontal shaft $21^a$, which is supported in brackets on the framework, there is mounted ratchet-wheel $21^b$, and fixed to the armature-rod $21^c$ is a pawl $21^d$, which co-operates with the said ratchet-wheel, the attraction of the armature of the electromagnet 22 causing the pawl to release the ratchet-wheel a half-cog, and when the armature is released the spring 21ᵉ completes the movement to the extent of a whole cog. On the inner end of shaft 21ᵃ is mounted a bevel gear-wheel 20ᵃ, and on the outer end of said shaft is fixed the pulley 21ᶠ, to which is attached a cord and weight 21ʰ, as seen in Fig. 1, the purpose of said weight being to keep a constant tension on shaft 21ᵃ of the escapement. Rigidly mounted on vertical shaft 20ᵇ of the feed mechanism, which shaft in the construction of Fig. 3, now being described, is adapted to have a vertical movement through its bearings, is a feed-wheel 20ᶜ, having teeth on a central part of its circumference, as well as teeth at the top and bottom on circumferences of reduced diameter. Above and below the feed-wheel 20ᶜ there are supported in suitable brackets of the framework and in contact with the bearings of the shaft 20ᵇ the bevel-gears 20ᵈ and 20ᵉ, the distance between the hubs of said bevel-gears being slightly greater than the length of the fixed feed-wheel 20ᶜ, and on the inner ends of the hubs of the bevel-gears 20ᵈ and 20ᵉ are provided teeth adapted to interlock with the teeth at the top and bottom of the feed-wheel 20ᶜ. At the lower end of the shaft 20ᵇ there is a collar 20ᶠ, adapted to receive the forked end of the rod 20ᵍ, the lower end of which is pivoted to the armature 20ʰ of the polarized magnet 24, thus mechanically connecting said armature to the shaft carrying the feed-wheel 20ᶜ. Supported on the frame in proper relation to the feed-wheel 20ᶜ is a guide-pulley 20ⁱ, provided with an adjusting-screw 20ᵏ, whereby the said wheel is adapted to keep the operating-arms of the receiver in proper contact with the feed-wheel, the ends of said arms being provided with teeth which mesh with the teeth of said feed-wheel 20ᶜ, as seen in Fig. 6. As feed-wheel 20ᶜ is rigidly fixed to the shaft 20ᵇ and said shaft is adapted to move freely through the hubs of the bevel-gears 20ᵈ 20ᵉ and said shaft is mechanically connected to the armature 20ʰ of the polarized magnet 24, it follows that as the said armature is reversed it will put the feed-gear 20ᶜ in contact with either of the gears 20ᵈ or 20ᵉ, according to the polarity of the current sent over the main line A, as hereinafter further explained. The armature 20ʰ of the polarized magnet 24 is provided with a counterweight, as 20ˡ, for the purpose of counterbalancing the feed-wheel 20ᶜ and its shaft 20ᵇ. As a modification of Fig. 3 the construction shown in Fig. 3ᵃ may be used. In this construction the feed-wheel 20ᶜ and the two bevel-gears 20ᵃ 20ᵉ are made in one piece with the shaft 20ᵇ, thus dispensing with the extra bearings and gearing on feed-wheel 20ᶜ and hubs of the bevel-wheels 20ᵈ 20ᵉ. The bevel-gear 20ᵃ on the escapement-shaft is sufficiently less in diameter than the space between the bevel-wheels 20ᵈ 20ᵉ, to allow said wheel 20ᵃ to be put in contact with either of the bevel-wheels 20ᵈ 20ᵉ as the shaft 20ᵇ is raised or lowered.

The main-line wires are indicated by A B, and 28 28ᵃ indicate the batteries which send impulses of opposite polarity over the main line A, and 29 29ᵃ are similar batteries, which send impulses over the main line B. These impulses are controlled by the circuit-interrupters C D, a forward movement of the transmitter-arms 13 13′ giving one polarity and the backward movement the reverse.

Having described the construction of the mechanism, I will now describe its relation to the system and its functions in describing the operation of the system.

When the transmitter-arm 13 is moved from the operator, a series of negative impulses, according to the distance the arm is moved, is sent over the line A, and by means of electromagnet 22, polarized magnet 24, and feeding mechanism G the receiving-pen is similarly moved. The current is then from ground F through wires c c c c, through battery 28ᵃ, wire c, through pole-changing arm 12ⁱ to circuit-interrupter C, thence by wire c′ to spring-contact d, through wire c′ to line A and to electromagnet 22 of the receiver, then to polarized magnet 24 and to ground through electromagnet Z. Electromagnet 22 responds to every impulse of either polarity and releases the escapement-wheel 21ᵇ a definite distance—that is, a distance in proportion to the movement of the arm 13 of the transmitter. When the pulsations are of a negative nature, armature 20ʰ of the polarized magnet 24 is drawn toward pole a of said magnet, which causes the shaft 20ᵇ to move downward, thereby locking the feed-wheel 20ᶜ with gear-wheel 20ᵉ in the manner as before explained, and this gives to the feed-wheel 20ᶜ a movement in a direction corresponding to the direction in which gear-wheel 20ᵉ is traveling. When the arm 13 of the transmitter is moved in a reverse direction, the impulses are of an opposite polarity and the current is then from ground F through wires c c c c′ by way of battery 28, which sends positive impulses to the line A, which impulses serve to throw armature 20ʰ of the polarized magnet 24 to pole b, and by doing so raises the shaft 20ᵇ, thus locking feed-wheel 20ᶜ with gear-wheel 20ᵈ, thereby reversing the direction of the movement of feed-wheel 20ᶜ. When impulses are sent over line B, the same results are obtained at the receiver, and on the movements being compounded at the receiver all lateral movements made at the transmitter are reproduced. By lateral movement of the pen I mean the forward and backward and right and left movements of the hand in writing. Lifting the pen is a perpendicular movement and is at an angle to the described lateral movements. By my invention I am enabled to transmit the perpendicular movements as well as the lateral movements without making use of any additional wires other than the two wires made use of in transmitting the lateral movements. The manner in which this result is accomplished will be now explained.

I make use of the commutator E heretofore described. One series of the strips of conducting material in one portion of the commutator-cylinder is connected electrically to battery 28 and the other series to battery $28^a$, as indicated in the drawings. Spring $16^c$ is connected to line A by way of wire $c^2$, and spring $16^d$ is connected to line B by way of wire $e$. The shaft of the commutator is provided with a ratchet-wheel $16^e$, which co-operates with a pawl $16^f$ on the end of lever $16^g$, which is pivoted in a standard $16^h$, all as shown in Fig. 10. The outer end of lever $16^h$ is flexibly connected to a tripod at $16^i$. Between the point of said connection and the channel $16^k$ in which the arm of the transmitter laterally moves there is an insulating substance placed, as shown in Fig. 10, to guard against short-circuiting. Spring $16^l$ breaks the ground when the commutator is moved by lifting the transmitter-pen, and springs $d$ $d^a$ simultaneously break the lines A and B, as seen in the diagrammatic view, Fig. 1, this result being effected by the projections of insulating material in the circumference of one portion of the commutating-cylinder.

The operation of the commutator will now be understood. The springs $16^c$ $16^d$, that are in contact with the cylinder of the commutator, normally rest upon insulating material, but upon revolving the cylinder one-eighth of a revolution an instantaneous contact is made between one of the metallic strips in the circumference of the cylinder that is connected to the negative pole of battery $28^a$ and with line A through spring $16^c$, and simultaneously contact is made between another of said metallic strips connected to the positive pole of battery 28 through spring $16^d$, connected to line B, and an instant before the contacts just described are made the projections on the other portion of the cylinder break the ground connection between spring $16^l$ and its contact, and also the connection between spring $d$ and its contact, thus breaking line A, and also separating spring $d^a$ from its contact, thus breaking line B. The cylinder is operated by an arm of the transmitter, it being joined to said arm by a sliding connection, as before explained. When the action of the commutator breaks the ground F and the lines A and B, as above explained, instantaneously the two batteries 28 $28^a$ are transformed into a single battery of twice the electromotive force of either individual battery, and being inserted in circuit with lines A B form a metallic circuit over which the momentary impulse giving the perpendicular movement passes. In this case the circuit is from battery 28 to commutator-shaft $16^b$, spring $16^c$, wire $c^2$ to line A, thence to electromagnet 22 to polarized magnet 24, thence to polarized magnet 25 to electromagnet 23 to line B, line $e$, and to spring $16^d$, thence to commutator-shaft $16^a$ to battery $28^a$, and thence back to battery 28. Enough of this impulse will pass between 30 and 31, through the condenser 17, to influence the polarized relay 15, causing it to close the local circuit, which influences electromagnet 18, which lifts the receiving-stylus from the paper. After this instantaneous contact between the several springs and the cylinder of the commutator the springs resume their normal positions, resting upon the insulating portions of the cylinder, thus restoring the several connections to their normal positions for the transmission of lateral movements.

The movement of placing the transmitting-pen on the paper connects the batteries 28 $28^a$ in metallic circuit with the lines A and B, as in the upward movement, except that the impulse of high electromotive force sent over the line will be of opposite polarity from the impulse previously sent, by reason of line A being momentarily connected with that pole of the battery to which the line B was previously momentarily connected in the upward movement of the stylus. The circuit is then from battery 28 to commutator-shaft $16^b$, spring $16^d$ to wire $e$ to line B; thence through the receiver-magnets and line A to spring $16^c$ to the negative end of battery $28^a$. This change of polarity of the momentary impulses of high electromotive force influences the polarized relay 15 and causes it to break the local circuit and lower the pen to the paper. By the time the pen has reached the paper the mechanism is again in its normal condition for giving the lateral movements. It will thus be seen that the automatic commutator, when the transmitting-pen is lifted, instantaneously transforms the two batteries into one battery in series and connects them in a metallic circuit with the lines A B, thus sending the impulses to lift the pen and as instantaneously restores the system to condition for giving the lateral movements, as before explained.

The batteries 29 $29^a$ are used to move the paper at the receiver. The push-button 32 performs the work at the transmitter. In Fig. 1 J is the cylinder on which the paper is rolled, and its escapement is controlled by said push-button 32. At the receiver, K indicates the cylinder for the paper and Z its electromagnet. The mode of operation of this mechanism is as follows: When the push-button 32 is depressed and let go, one tooth of the escapement-wheel 33 is released, allowing the cylinder J to move a distance proportionate to its diameter and number of teeth in the escapement. The movement of the paper-cylinder K at the receiver is the same as that of the cylinder J at the transmitter, but its escapement is controlled by electromagnet Z, influenced by batteries 29 $29^a$, the paper being moved a distance corresponding to the space through which the periphery of the cylinder travels, and simultaneously a like movement of the paper takes place by means of the commutating system, as follows: The ground for the batteries 29 $29^a$ is broken by pressing contact 34 away from contact 35, said contact 34 being at the same time pressed against contact 36, while insulation 37 of contact-spring 34 pushes contact 38 against contact 39. These movements connect batteries 29 29$^a$ with each other and give high enough electromotive force to influence electromagnet Z placed in common ground of lines A and B at the receiver. The current is for that instant from ground F to line c, to contact 34, to contact 36, to battery 29, to battery 29$^a$, to contacts 38 39, to line B, thence to magnet Z to the ground. It should be stated that the spring 40 is strong enough to resist the magnetic pull of the writing-currents, but is overcome by the impulse just referred to.

Wherever in this description the term "feed-wheel" is used, it is to be understood as meaning the wheel on the receiving-shaft, which is connected with the armature of the polarized and reversing magnet.

In this application I have not broadly claimed the fundamental combinations which have made it possible to produce a writing-telegraph system in which only two wires join the communicating-stations, and in which the fundamental telautographic operations of moving the receiver-pen and controlling the direction of its motion, lifting and lowering this pen and shifting the receiver-paper, are effected by actual currents transmitted over the line-wires, both positive and negative currents being used, since these are broadly claimed in my other application for Letters Patent of the United States, filed January 9, 1894, renewed December 24, 1894, Serial No. 532,891, which, it is intended, shall issue on the same day with this application.

Having thus described my invention, what I claim as new, and desire to secure by Letters Patent, is—

1. In writing telegraphs, the method herein described of transmitting the perpendicular movements of writing over the same main lines that transmit the lateral movements of writing, the same consisting in disconnecting the terminals of two main line wires at the transmitter and cutting off the common ground and batteries, and then inserting for an instant between the main line wire terminals a battery of greater power than either of the individual batteries on the main lines, substantially as set forth.

2. In writing telegraphs employing two main line wires only, the method herein described of producing a movement at an angle to the two movements which when compounded give the lateral movements of writing, which consists in momentarily commutating at the transmitter the said two main lines and transforming them into a single metallic circuit over which the impulses for giving the desired movement are transmitted, substantially as set forth.

3. In writing telegraphs, the method herein described of transmitting the perpendicular movements of writing over the same main line wires that transmit the lateral movements of writing, which consists in momentarily commutating said main line wires and the batteries automatically by the movement of the transmitting pen, substantially as set forth.

4. In writing telegraphs employing two main line wires only, the method herein described of moving the paper at the receiver, which consists in commutating at the transmitter one of said main line wires and sending an impulse over said line of greater power than required to produce one of the lateral movements of writing, substantially as set forth.

5. In writing telegraphs, the method herein described of operating the paper shifting mechanism at the receiver, the same consisting in manually operating the escapement of the paper shifting cylinder at the transmitter and then momentarily transforming the batteries at the transmitter into a single battery in series by grounding one end at the transmitter and the other end at the receiver, the high electromotive force of the battery thus brought into action influencing the electrically controlled paper shifting cylinder at the receiver, substantially as set forth.

6. In writing telegraphs, the method herein described of operating the paper shifting mechanism at the receiver over one of the main line wires used in transmitting the lateral movements in writing, which consists in manually operating the escapement of the paper shifting cylinder at the transmitter, then automatically commutating the batteries used in sending impulses over said main line, whereby the electrically controlled paper shifting cylinder at the receiver is influenced, substantially as set forth.

7. The combination of a writing telegraph transmitter stylus and a commutator operated by the stylus when the latter is raised or lowered, the said commutator having two pairs of contacts connected in series, and means for reversing the connections between these pairs of contacts with each successive operation of the commutator, substantially as described.

8. In writing telegraphs, a commutator consisting of a cylinder of non-conducting material provided with strips of conducting material in one portion thereof and extensions of insulating material in the other portion thereof, substantially as described.

9. In writing telegraphs, a commutator consisting of a cylinder of non-conducting material, having strips of conducting material in one portion thereof and extensions of insulating material in the other portion thereof, and springs at intervals, and electric connections whereby the springs and conducting strips can be connected to the batteries, main lines and ground, said springs co-operating with the strips of conducting material on the cylinder, and other springs having connections whereby they can be electrically connected with the main lines, said other springs co-operating with the extensions of insulating material in the said cylinder, substantially as described.

10. In writing telegraphs, a commutator, provided with two pairs of contacts connected in series, a transmitting pen, a pivoted lever mechanically connected to the commutator shaft and the said pen, and appliances on the commutator shaft and said lever whereby the commutator cylinder is caused to move a definite space in one direction as the transmitting pen is raised or lowered, substantially as described.

11. In writing telegraphs, a cylindrical commutator, and two pairs of contacts connected in series, a transmitting pen, and a pawl and ratchet movement in mechanical connection with the said commutator and the said transmitter pen, but unaffected by the lateral movements of the pen, whereby when the said stylus is lifted or lowered, the commutating cylinder is moved a definite distance in one direction, reversing the connections through the said pairs of contacts of the commutator each time it is operated, substantially as described.

12. In writing telegraphs, the combination with the transmitter of a two part cylindrical commutator the shaft of which is also in two parts which are insulated from each other, one portion of said cylinder provided with a series of conducting strips, each alternate strip of the series being connected with one portion of the shaft and the other strips of the series connected to the other portion of the shaft, substantially as set forth.

13. In writing telegraphs, a cylindrical commutator having a metallic shaft in two parts electrically separated from each other, and provided with two series of conducting strips and insulated extensions arranged in the cylinder to insure an impulse of opposite polarity at every movement and restore the circuits again to their normal condition at the same movement, substantially as set forth.

14. In writing telegraphs, a commutator provided with a shaft in two parts, insulated from each other, one portion of said shaft being provided with connections whereby it can be connected with one line wire, while at the same time the other portion is connected with the other line wire, a third connection whereby the line wire can be grounded, and means for breaking the grounding connection in the commutator when the commutator is operated, substantially as described.

15. In writing telegraphs, a commutator provided with a two-part shaft, the two parts being electrically insulated from each other, connections whereby the two parts can be connected up simultaneously to the two poles of the battery in either direction, a third contact whereby the said battery can be grounded, the commutator being so constructed as to complete the circuit of the battery through it and break the said ground each time it is operated, substantially as described.

16. In writing telegraphs, a commutator having a shaft in two parts, insulated from each other and provided with two series of contact strips, connections between one series of strips and one part of the shaft, and the other series of strips and the other part of the shaft, connections for the parts of the shaft whereby they can be connected to opposite poles of the battery, and contact fingers to engage said strips, but normally out of contact therewith, substantially as described.

17. In writing telegraphs, a commutator having a shaft in two parts, insulated from each other, and provided with two series of contact strips, connections between one series of strips and one part of the shaft, and the other series of strips and the other part of the shaft, connections for the parts of the shaft whereby they can be connected to opposite poles of the battery, and contact fingers to engage said strips, but normally out of contact therewith, and a third contact whereby the battery can be grounded, which contact is normally closed, but is open when the commutator is operated, substantially as described.

18. In writing telegraphs, the combination with a circuit interrupter mechanically connected with the transmitter stylus and including a disk capable of revolving in either direction and provided with a sinuous channel, of a pivoted contact maker the fulcrum of which is between the sinuous channel of the disk and the contact point of the circuit interrupted and which only moves to and fro whichever way the disk is revolved and in its positive co-operation with said disk makes and breaks the circuit in which it is placed, always at the same contact, substantially as set forth.

19. In writing telegraphs, the combination with the transmitter stylus and a circuit interrupter mechanically connected with said transmitter stylus and comprising a revoluble disk or wheel capable of movement in either direction, of a pivoted contact maker adapted to be vibrated by co-operation of one of its ends with said revoluble disk, substantially as set forth.

20. In writing telegraphs, a circuit interrupter mechanically connected with the transmitter stylus and comprising a revoluble disk or wheel capable of movement in either direction and provided with a sinuous groove or channel, of a pivoted contact maker adapted to be alternately forced into and out of contact with the line contact by its co-operation with the said sinuous channel as the stylus is manipulated in writing, substantially as set forth.

21. In writing telegraphs, the combination with the transmitter stylus, of a pair of circuit interrupters mechanically connected with said stylus and each comprising a suitably mounted disk or wheel provided with a sinuous channel, of two pivoted vibratory contact makers co-operating with the sinuous channels in the disks, whereby as the transmitter stylus is moved by the operator in either direction said disks are caused to revolve, thereby causing said contact makers to move a definite and positive distance to and fro to make contact between the contact points and the line contacts, substantially as set forth.

22. In writing telegraphs, a circuit interrupter consisting of a wheel or disk provided with a sinuous channel and mounted on a vertical shaft, a gear wheel also fixed to said shaft and a guide or pressure pulley supported in proper relation to said gear wheel, in combination with a pivoted contact maker coacting with the sinuous channel of said disk or wheel, and an arm of the transmitter pen provided with teeth and co-operating with said gear wheel and pressure pulley, substantially as set forth.

23. In writing telegraphs, the combination with a circuit interrupter comprising a disk or wheel mounted on a vertical shaft and co-operating with a pivoted contact maker, and a gear wheel likewise mounted on said vertical shaft and co-operating with a pressure pulley and with an arm of the transmitter stylus, of a pole changing arm likewise mounted on said vertical shaft and frictionally connected to the revolving part of the circuit interrupter and making the desired contacts as the transmitter arm is moved backward or forward, substantially as set forth.

24. In writing telegraphs, the combination with the circuit interrupter comprising a disk or wheel mounted on a vertical shaft and a gear wheel also mounted on said shaft, the said disk or wheel coacting with a pivoted contact maker and said gear wheel with an arm of the transmitter stylus, of a pole changing arm loosely mounted on said shaft and provided with a spring as $12^m$ whereby the necessary frictional contact between said arm and the movable part of the circuit interrupter is secured, substantially as set forth.

25. In writing telegraphs, the combination with two line wires and a polarized magnet and condenser bridged across said lines at the receiver, of a cylindrical commutator and a circuit interrupter at the transmitter and a vibratory contact maker, said circuit interrupter mechanically connected with the stylus of the transmitter and operating as said stylus is manipulated in writing to alternately push said contact maker against and pull it away from a conducting contact, substantially as set forth.

26. In a feed mechanism of a writing telegraph, the combination with a motor shaft moving in one direction only and provided with an escapement wheel and a gear wheel rigidly attached thereto, of two gear wheels pinioned to be operated by said first mentioned gear wheel, a second shaft provided with a feed wheel, said shaft having bearings through the said two gear wheels, said feed wheel adapted to receive motion from one or the other of said two gear wheels and a polarized magnet the armature of which is attached to said feed wheel shaft, substantially as set forth.

27. In a feed mechanism of a writing telegraph, two shafts arranged at an angle to each other, one of said shafts carrying an escapement and gear wheel and revolving in one direction only, and the other carrying the feed wheel and having its bearings through two gear wheels adapted to be operated by the gear wheel on the first mentioned shaft, and revolving in either of two directions, the said feed wheel shaft also having two motions through its bearings at right angles to its direction of revolution, in combination with a polarized magnet and a co-operating armature which is attached to said feed-wheel shaft, substantially as set forth.

28. In a receiver feed mechanism of a writing telegraph, the combination with the shaft carrying the feed wheel, said shaft having a right and left motion through the two gearwheels which give motion to said feed wheel, of a polarized magnet having its armature mechanically connected to said shaft whereby the movements of the feed mechanism are reversed as the polarity of the current is changed, substantially as set forth.

29. In a feed mechanism of a writing telegraph, the combination with an escapement shaft and three gear wheels whose movements are controlled by said shaft and which always revolve each in its own direction which is always the same, of a feed wheel and its shaft, a polarized magnet and co-operating armature mechanically connected to said feed wheel shaft whereby the movement of the feed wheel shaft is adapted to be reversed without any change in the direction of movement of the escapement shaft or the aforesaid gear wheels, substantially as set forth.

30. In a feed mechanism of a writing telegraph, the combination with a shaft carrying an escapement wheel and provided with a weight or its equivalent which causes the said shaft to revolve in one direction when the escapement is released, of a feed mechanism consisting of a train of three gear wheels and a feed wheel on a shaft said shaft having a movement at an angle to its revolving movements, substantially as set forth.

31. In a feed mechanism of a writing telegraph, the combination with a shaft carrying an escapement wheel and provided with a gear wheel at one end and always revolving in one direction and an electromagnet controlling the escapement, of two gear wheels and a feed wheel located on a shaft between said two gear wheels with which it co-operates, said shaft passing freely through the centers of said two gear wheels and mechanically connected to the armature of a polarized magnet, substantially as set forth.

32. In a receiving feed mechanism of a writing telegraph, the combination with a motor shaft moving in one direction only and provided with an escapement wheel, a motor wheel and a gear wheel rigidly attached thereto, of a reversing shaft having rigidly pinioned thereon two gear wheels both traveling always in the same direction and operated by the gear wheel on the motor shaft, a feed wheel on the reversing shaft between the said pinioned gear wheels and a polarized magnet the armature of which is mechanically connected to the reversing shaft, substantially as set forth.

33. In writing telegraphs, a paper shifting drum at the transmitter, and a lever adapted to operate said drum, and a compound commutator at the transmitter with suitable contacts operated by the movement of the lever, which operates said paper shifter, substantially as described.

Signed at New York, in the county of New York and State of New York, this 2d day of February, A. D. 1895.

JAMES HART ROBERTSON.

Witnesses:
F. J. EMLEY,
J. R. SHUMAKER.